(12) United States Patent
Takagi

(10) Patent No.: US 12,331,179 B2
(45) Date of Patent: Jun. 17, 2025

(54) METHODS OF EVALUATING AND PRODUCING COMPOSITE MATERIAL, AND COMPOSITE MATERIAL

(71) Applicant: ZEON CORPORATION, Tokyo (JP)

(72) Inventor: Kazuki Takagi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 658 days.

(21) Appl. No.: 17/595,503

(22) PCT Filed: May 25, 2020

(86) PCT No.: PCT/JP2020/020627
§ 371 (c)(1),
(2) Date: Nov. 18, 2021

(87) PCT Pub. No.: WO2020/241601
PCT Pub. Date: Dec. 3, 2020

(65) Prior Publication Data
US 2022/0213290 A1    Jul. 7, 2022

(30) Foreign Application Priority Data

May 31, 2019    (JP) ................... 2019-102821

(51) Int. Cl.
*G01K 17/00*      (2006.01)
*C08K 3/04*      (2006.01)
(Continued)

(52) U.S. Cl.
CPC ............... *C08K 3/041* (2017.05); *G01N 5/04* (2013.01); *G01K 11/00* (2013.01); *G01K 17/00* (2013.01); *G01N 25/00* (2013.01)

(58) Field of Classification Search
CPC ...... G01N 5/04; G01N 25/4866; G01N 25/00; C08K 3/041; C08K 2201/003; C08L 27/16; G01K 11/00; G01K 17/00
See application file for complete search history.

(56) References Cited

U.S. PATENT DOCUMENTS

| 10,494,492 B2 | 12/2019 | Ata et al. |
| 2008/0318049 A1 | 12/2008 | Hata et al. |

(Continued)

FOREIGN PATENT DOCUMENTS

| CA | 2803136 A1 * | 12/2011 | ......... A61K 47/6905 |
| CA | 3172301 A1 * | 9/2021 | ........ H01M 10/0525 |

(Continued)

OTHER PUBLICATIONS

U.S. Appl. No. 17/595,503, filed Sep. 18, 2024_DE_102011051871_A1_H.pdf,,Jan. 17, 2013.*

(Continued)

*Primary Examiner* — Peter J MacChiarolo
*Assistant Examiner* — Gail Kaplan Verbitsky
(74) *Attorney, Agent, or Firm* — KENJA IP LAW PC

(57) ABSTRACT

Provided is a technique for quantitatively evaluating a disentanglement state of fibrous carbon nanostructures in a composite material by a simple method. A method of evaluating a composite material containing a polymer and fibrous carbon nanostructures includes: a step (A) of heating the composite material in an inert gas atmosphere to remove a polymer component from the composite material and obtain a polymer-removed product; a step (B) of performing thermogravimetric analysis of the polymer-removed product in an oxygen-containing atmosphere to measure change over time of mass of the polymer-removed product; and a step (C) of evaluating a disentanglement state of the fibrous carbon nanostructures in the composite material from a relationship between mass change of the polymer-removed product and elapsed time obtained in the step (B).

5 Claims, 2 Drawing Sheets

(51) Int. Cl.
  *G01N 5/04* (2006.01)
  *G01K 11/00* (2006.01)
  *G01N 25/00* (2006.01)

(56) References Cited

U.S. PATENT DOCUMENTS

| | | | | |
|---|---|---|---|---|
| 2010/0189628 | A1* | 7/2010 | Schimpf | B82B 3/0076 |
| | | | | 423/447.2 |
| 2018/0044184 | A1 | 2/2018 | Ata et al. | |
| 2019/0276610 | A1 | 9/2019 | Takeyama et al. | |

FOREIGN PATENT DOCUMENTS

| | | | | |
|---|---|---|---|---|
| CN | 107207869 | A | 9/2017 | |
| CN | 107406682 | A | 11/2017 | |
| DE | 102011051871 | A1 * | 1/2013 | B29C 70/58 |
| JP | 10048851 | A * | 2/1998 | |
| JP | 2008274060 | A | 11/2008 | |
| JP | 2009235650 | A * | 10/2009 | |
| JP | 5229488 | B2 * | 7/2013 | |
| JP | 2019171790 | A * | 10/2019 | |
| JP | 6787339 | B2 * | 11/2020 | B82B 1/005 |
| KR | 2010038979 | A * | 4/2010 | B82Y 15/00 |
| KR | 20100038979 | A * | 4/2010 | |
| KR | 20100038989 | A * | 4/2010 | |
| WO | 2006011655 | A1 | 2/2006 | |
| WO | 2017110615 | A1 | 6/2017 | |
| WO | 2018066528 | A1 | 4/2018 | |
| WO | WO-2019188051 | A1 * | 10/2019 | C08J 3/2053 |
| WO | WO-2020241601 | A1 * | 12/2020 | C08K 3/041 |
| WO | WO-2022181193 | A1 * | 9/2022 | |
| WO | WO-2023220753 | A2 * | 11/2023 | C01B 21/064 |

OTHER PUBLICATIONS

U.S. Appl. No. 17/595,503, filed Sep. 18, 2024_WO_2019188051_A1_H.pdf,Dec. 3, 2020.*
U.S. Appl. No. 17/595,503, filed Sep. 18, 2024_WO_2022181193_A1_H.pdf,Sep. 1, 2022.*
U.S. Appl. No. 17/595,503, filed Sep. 24, 2024_CA_2803136_A1_H.pdf,Dec. 29, 2011.*
U.S. Appl. No. 17/595,503, filed Sep. 24, 2024_CA_3172301_A1_H.pdf,Sep. 30, 2021.*
U.S. Appl. No. 17/595,503, filed Sep. 24, 2024_JP_5229488_B2_H.pdf,Jul. 3, 2013.*
U.S. Appl. No. 17/595,503, filed Sep. 24, 2024_WO_2023220753_A2_H.pdf,Nov. 16, 2023.*
U.S. Appl. No. 17/595,503, filed Sep. 24, 2024_KR_20100038979_A_H.pdf,Apr. 15, 2010.*
U.S. Appl. No. 17/595,503, filed Sep. 18, 2024_WO_2020241601_A1_H.pdf,Dec. 3, 2020.*
U.S. Appl. No. 17/595,503, filed Sep. 18, 2024_WO_2019188051_A1_H.pdf,Oct. 3, 2019.*
U.S. Appl. No. 17/595,503, filed Dec. 16, 2024_KR_20100038979_A_H.pdf,Apr. 15, 2010.*
U.S. Appl. No. 17/595,503, filed Dec. 16, 2024_WO_2019188051_A1_H.pdf,Oct. 3, 2019.*
U.S. Appl. No. 17/595,503, filed Dec. 16, 2024_WO_2020241601_A1_H.pdf,Dec. 3, 2020.*
U.S. Appl. No. 17/595,503, filed Feb. 18, 2025_JP_2019171790_A_H.pdf,Oct. 10, 2019.*
U.S. Appl. No. 17/595,503, filed Feb. 18, 2025_JP_6787339_B2_H.pdf,Nov. 18, 2020.*
U.S. Appl. No. 17/595,503, filed Feb. 18, 2025_KR_20100038989_A_H.pdf,Apr. 15, 2010—Machine Translation.*
U.S. Appl. No. 17/595,503, filed Feb. 18, 2025_JP10048851_original.pdf,Feb. 20, 1998.*
English translation of KR-2010-038979 abstract and claims (Year: 2025).*
Aug. 4, 2020, International Search Report issued in the International Patent Application No. PCT/JP2020/020627.
Nov. 16, 2021, International Preliminary Report on Patentability issued in the International Patent Application No. PCT/JP2020/020627.
May 22, 2023, the Extended European Search Report issued by the European Patent Office in the corresponding European Patent Application No. 20814877.5.

* cited by examiner

METHODS OF EVALUATING AND PRODUCING COMPOSITE MATERIAL, AND COMPOSITE MATERIAL

TECHNICAL FIELD

The present disclosure relates to a composite material, a method of evaluating a composite material, and a method of producing a composite material, and, in particular, relates to a composite material containing a polymer and fibrous carbon nanostructures and to methods of evaluating and producing this composite material.

BACKGROUND

Composite materials in which a carbon material is compounded with a polymer, such as a resin or rubber, are conventionally used as materials having excellent electrical conductivity, thermal conductivity, mechanical characteristics, and so forth. Moreover, fibrous carbon materials, and particularly fibrous carbon nanostructures such as carbon nanotubes, have attracted attention in recent years as carbon materials that are highly effective for improving electrical conductivity, thermal conductivity, and mechanical characteristics.

Although fibrous carbon nanostructures such as carbon nanotubes have excellent characteristics individually, they have a high tendency to form bundles due to Van der Waals forces when used as a bulk material due to the small external diameter thereof, and thus do not have a large effect on improving performance as a bulk material. For this reason, it is desirable that, in production of a composite material containing a polymer and fibrous carbon nanostructures, bundle structures of the fibrous carbon nanostructures are broken up (disentangled) and that the fibrous carbon nanostructures are dispersed well in a matrix of the polymer.

One example of a known method for disentangling bundle structures of fibrous carbon nanostructures is a method in which disentanglement treatment is performed by using a disperser such as a bead mill, a disper blade, a homogenizer, or an ultrasonic disperser to impart shear force to a dispersion liquid containing fibrous carbon nanostructures dispersed in a dispersion medium or to a polymer composition containing a polymer and fibrous carbon nanostructures (for example, refer to Patent Literature (PTL) 1).

Moreover, as described in PTL 1, for example, the degree of disentanglement of fibrous carbon nanostructures in a composite material containing a polymer and fibrous carbon nanostructures is evaluated by measuring physical properties (for example, electrical conductivity) of the composite material.

CITATION LIST

Patent Literature

PTL 1: JP2008-274060A

SUMMARY

Technical Problem

When the performance expected of a composite material containing fibrous carbon nanostructures that have undergone disentanglement treatment is not achieved, it may be the case that insufficient disentanglement treatment has been performed or that the fibrous carbon nanostructures have been damaged by excessive disentanglement treatment. However, in a conventional method of evaluating the degree of disentanglement of fibrous carbon nanostructures through measurement of a physical property of a composite material as described above, it is not possible to accurately determine the disentanglement state of the fibrous carbon nanostructures in the composite material, and thus it is not possible to judge whether the reason that the expected performance is not achieved is due to insufficient disentanglement treatment or due to damage of the fibrous carbon nanostructures caused by excessive disentanglement treatment. This means that the conventional technique described above suffers from problems such as that adjustment of disentanglement treatment conditions of fibrous carbon nanostructures in production of a composite material is complicated, for example.

Although a method in which the state of fibrous carbon nanostructures in a composite material is observed using an electron microscope, for example, may be considered in response to such problems, a method in which an electron microscope is used also has problems of requiring complicated work and not enabling quantitative evaluation of the disentanglement state of fibrous carbon nanostructures.

Therefore, there has been demand for a technique for quantitatively evaluating the disentanglement state of fibrous carbon nanostructures in a composite material by a simple method.

There has also been demand for a technique for efficiently producing a composite material in which fibrous carbon nanostructures are dispersed well and for a composite material in which fibrous carbon nanostructures are dispersed well.

Solution to Problem

The inventor conducted diligent studies with the aim of solving the problems set forth above. The inventor discovered that for a composite material containing a polymer and fibrous carbon nanostructures, the combustion time taken to combust fibrous carbon nanostructures remaining after a polymer component has been removed from the composite material correlates with the degree of disentanglement of the fibrous carbon nanostructures in the composite material, and, in this manner, completed the present disclosure.

Specifically, the present disclosure aims to advantageously solve the problems set forth above, and a presently disclosed method of evaluating a composite material is a method of evaluating a composite material containing a polymer and fibrous carbon nanostructures, comprising: a step (A) of heating the composite material in an inert gas atmosphere to remove a polymer component from the composite material and obtain a polymer-removed product; a step (B) of performing thermogravimetric analysis of the polymer-removed product in an oxygen-containing atmosphere to measure change over time of mass of the polymer-removed product; and a step (C) of evaluating a disentanglement state of the fibrous carbon nanostructures in the composite material from a relationship between mass change of the polymer-removed product and elapsed time obtained in the step (B). By removing a polymer component from a composite material to obtain a polymer-removed product, subsequently performing thermogravimetric analysis of the polymer-removed product in an oxygen-containing atmosphere, and evaluating a disentanglement state of fibrous carbon nanostructures in the composite material from a relationship between mass change of the polymer-removed product and elapsed time in this manner, it is possible to quantitatively evaluate the disentanglement state of the fibrous carbon nanostructures in the composite material by a simple method.

In the presently disclosed method of evaluating a composite material, it is preferable that the step (C) includes: a step (c1) of obtaining a derivative thermogravimetric curve from mass change of the polymer-removed product and elapsed time obtained in the step (B); a step (c2) of determining an elapsed time $T_1$ at which the derivative thermogravimetric curve takes a local minimum value directly before a final peak on the derivative thermogravimetric curve; and a step (c3) of determining time taken for mass $M_1$ of the polymer-removed product at the elapsed time $T_1$ to decrease to a specific proportion, and that the disentanglement state of the fibrous carbon nanostructures in the composite material is evaluated from the time taken. By determining the time taken for the mass $M_1$ of the polymer-removed product at the elapsed time $T_1$ to decrease to a specific proportion and by evaluating the disentanglement state of the fibrous carbon nanostructures in the composite material from the time taken, it is possible to more accurately evaluate the disentanglement state of the fibrous carbon nanostructures.

In the presently disclosed method of evaluating a composite material, it is preferable that time taken for mass of the polymer-removed product to decrease to $M_1 \times 0.10$ is determined in the step (c3). By using the time taken for the mass of the polymer-removed product to decrease to $M_1 \times 0.10$ in the step (c3), it is possible to more accurately evaluate the disentanglement state of the fibrous carbon nanostructures.

Note that the time taken for the mass of the polymer-removed product to decrease to $M_1 \times 0.50$ may alternatively be determined in the step (c3) of the presently disclosed method of evaluating a composite material.

Moreover, the present disclosure aims to advantageously solve the problems set forth above, and a presently disclosed method of producing a composite material is a method of producing a composite material containing a polymer and fibrous carbon nanostructures through a step of performing disentanglement treatment of the fibrous carbon nanostructures, comprising: a step ($\alpha$) of evaluating a disentanglement state of fibrous carbon nanostructures in a produced composite material using any one of the methods of evaluating a composite material set forth above; and a step ($\beta$) of, based on an evaluation result obtained in the step ($\alpha$), altering a condition of the disentanglement treatment to obtain a fibrous carbon nanostructure disentanglement state that is within a desired range in a situation in which the disentanglement state of the fibrous carbon nanostructures is outside of the desired range. By evaluating the disentanglement state of fibrous carbon nanostructures using the method of evaluating a composite material set forth above and altering a condition of disentanglement treatment based on an obtained evaluation result in this manner, it is possible to efficiently produce a composite material in which fibrous carbon nanostructures are dispersed well.

Furthermore, a presently disclosed composite material is a composite material comprising a polymer and fibrous carbon nanostructures, wherein, in a situation in which a sheet of 150 μm in thickness that is formed using the composite material is subjected to removal of a polymer component in the sheet in an inert gas atmosphere at 600° C. to obtain a polymer-removed product, and then the inert gas atmosphere is switched to an air atmosphere and change over time of mass of the polymer-removed product is measured, time taken for mass $M_1$ of the polymer-removed product to decrease to $M_1 \times 0.10$ is 250 seconds or less, where the mass $M_1$ is mass of the polymer-removed product at an elapsed time $T_1$ at which a derivative thermogravimetric curve obtained from mass change of the polymer-removed product and elapsed time takes a local minimum value directly before a final peak. A composite material for which, upon undergoing thermogravimetric analysis in the form of a sheet of 150 μm in thickness, the time taken for the mass $M_1$ of a polymer-removed product to decrease to $M_1 \times 0.10$ is 250 seconds or less in this manner has good dispersion of fibrous carbon nanostructures and can display excellent physical properties.

In the presently disclosed composite material, a fluorine-containing polymer can be used as the polymer.

In the presently disclosed composite material, the fibrous carbon nanostructures preferably include single-walled carbon nanotubes. When the fibrous carbon nanostructures include single-walled carbon nanotubes, the composite material can display even better physical properties.

In the presently disclosed composite material, the single-walled carbon nanotubes preferably have a G/D ratio of not less than 1 and not more than 4. When the G/D ratio of the single-walled carbon nanotubes is not less than 1 and not more than 4, the composite material can display even better physical properties.

In the presently disclosed composite material, the single-walled carbon nanotubes preferably have an average diameter of not less than 1.5 nm and not more than 5 nm, and more preferably not less than 2 nm and not more than 4 nm. When the average diameter of the single-walled carbon nanotubes is within any of the numerical ranges set forth above, the composite material can display even better physical properties.

Advantageous Effect

According to the presently disclosed method of evaluating a composite material, it is possible to quantitatively evaluate the disentanglement state of fibrous carbon nanostructures in a composite material by a simple method.

Moreover, according to the presently disclosed method of producing a composite material, it is possible to efficiently produce a composite material in which fibrous carbon nanostructures are dispersed well.

Furthermore, according to the present disclosure, it is possible to obtain a composite material in which fibrous carbon nanostructures are dispersed well.

DETAILED DESCRIPTION

Figure 1A:
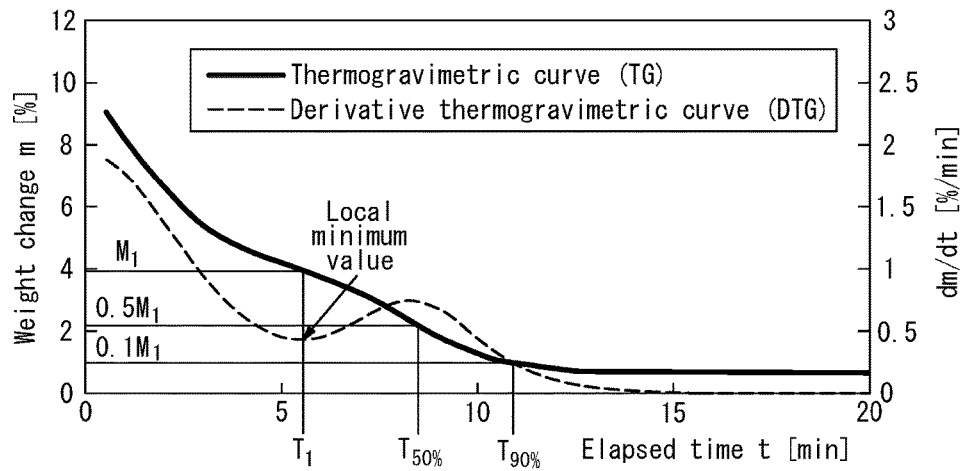
FIGS. 1A to 1C are graphs illustrating results of thermogravimetric analysis of polymer-removed products of composite materials 1 to 3, respectively.

The following provides a detailed description of embodiments of the present disclosure.

The presently disclosed method of evaluating a composite material is used with respect to a composite material containing fibrous carbon nanostructures and a polymer in order to evaluate the disentanglement state of the fibrous carbon nanostructures in the composite material. Moreover, the presently disclosed method of producing a composite material is used in production of a composite material that contains fibrous carbon nanostructures and a polymer. Furthermore, the presently disclosed composite material can, without any specific limitations, be used in production of various shaped products such as belts, hoses, gaskets, packings, and oil seals, for example.

(Method of Evaluating Composite Material)

The presently disclosed method of evaluating a composite material is a method of evaluating a composite material that contains a polymer and fibrous carbon nanostructures. A feature of the presently disclosed method of evaluating a composite material is that the method includes: a step (A) of removing a polymer component from a composite material to obtain a polymer-removed product; a step (B) of performing thermogravimetric analysis of the polymer-removed product to measure change over time of mass of the polymer-removed product; and a step (C) of evaluating a disentanglement state of fibrous carbon nanostructures from a relationship between mass change of the polymer-removed product and elapsed time.

By evaluating the disentanglement state of fibrous carbon nanostructures in a composite material from a relationship between mass change of a polymer-removed product and elapsed time in this manner, it is possible to quantitatively evaluate the disentanglement state of the fibrous carbon nanostructures in the composite material by a simple method.

Note that although it is not clear why the disentanglement state of fibrous carbon nanostructures can be evaluated from the relationship between mass change of a polymer-removed product and elapsed time, it is presumed that as disentanglement of fibrous carbon nanostructures progresses, the surface area of the fibrous carbon nanostructures increases, and thus the fibrous carbon nanostructures are more easily combusted during thermogravimetric analysis in an oxygen-containing atmosphere (i.e., the rate of mass loss increases).

Composite Material

The composite material that is an evaluation subject contains a polymer and fibrous carbon nanostructures and may optionally further contain various additives depending on the use the composite material. Note that the composite material can be produced by mixing the components described above by a known method, for example, without any specific limitations.

Polymer

The polymer can be any rubber, resin, or mixture thereof, for example, without any specific limitations.

Specific examples of rubbers that can be used include, but are not specifically limited to, natural rubber; fluororubbers such as vinylidene fluoride rubber (FKM), tetrafluoroethylene-propylene rubber (FEPM), and tetrafluoroethylene-perfluorovinyl ether rubber (FFKM); diene rubbers such as butadiene rubber (BR), isoprene rubber (IR), styrene-butadiene rubber (SBR), hydrogenated styrene-butadiene rubber (H-SBR), nitrile rubber (NBR), and hydrogenated nitrile rubber (H-NBR); and silicone rubber.

Examples of resins that can be used include, but are not specifically limited to, fluororesins such as polytetrafluoroethylene (PTFE) and polychlorotrifluoroethylene (PCTFE); acrylic resins such as polymethyl methacrylate (PMMA); polystyrene (PS); polycarbonate (PC); and cycloolefin polymers (COPs).

One of the polymers described above may be used individually, or two or more of the polymers described above may be used as a mixture.

Fibrous Carbon Nanostructures

The fibrous carbon nanostructures may, without any specific limitations, be circular tube-shaped carbon nanostructures such as carbon nanotubes (hereinafter, also referred to as "CNTs") or non-circular tube-shaped carbon nanostructures such as carbon nanostructures resulting from a 6-membered ring network of carbon being formed in a flattened tube shape. One of these types of fibrous carbon nanostructures may be used individually, or two or more of these types of fibrous carbon nanostructures may be used in combination.

Of the examples given above, fibrous carbon nanostructures that include CNTs are more preferably used as the fibrous carbon nanostructures. This is because by using fibrous carbon nanostructures that include CNTs, characteristics (for example, electrical conductivity, thermal conductivity, and strength) of the composite material can be improved even using a small amount of the fibrous carbon nanostructures.

The fibrous carbon nanostructures including CNTs may consist solely of CNTs or may be a mixture of CNTs and fibrous carbon nanostructures other than CNTs.

Although single-walled carbon nanotubes and/or multi-walled carbon nanotubes can be used as CNTs in the fibrous carbon nanostructures without any specific limitations, carbon nanotubes having from one to five walls are preferable, and single-walled carbon nanotubes are more preferable. This is because carbon nanotubes having fewer walls can improve characteristics (for example, electrical conductivity, thermal conductivity, and strength) of the composite material even using a small amount thereof.

The average diameter of the fibrous carbon nanostructures is preferably 1 nm or more, more preferably 1.5 nm or more, and even more preferably 2 nm or more, and is preferably 30 nm or less, more preferably 10 nm or less, even more preferably 5 nm or less, and particularly preferably 4 nm or less. When the average diameter of the fibrous carbon nanostructures is within any of the ranges set forth above, characteristics (for example, electrical conductivity, thermal conductivity, and strength) of the composite material can be sufficiently improved.

The "average diameter of the fibrous carbon nanostructures" referred to in the present disclosure can be determined by measuring the diameters (external diameters) of 20 fibrous carbon nanostructures, for example, in a transmission electron microscope (TEM) image, and then calculating a number-average value of the measured diameters.

The fibrous carbon nanostructures are preferably fibrous carbon nanostructures for which a ratio ($3\sigma/Av$) of a value ($3\sigma$), which is obtained by multiplying the diameter standard deviation ($\sigma$: sample standard deviation) by 3, relative to the average diameter (Av) is more than 0.20 and less than 0.80, more preferably fibrous carbon nanostructures for which $3\sigma/Av$ is more than 0.25, and even more preferably fibrous carbon nanostructures for which $3\sigma/Av$ is more than 0.50. Moreover, fibrous carbon nanostructures for which the aforementioned ratio ($3\sigma/Av$) is more than 0.20 and less than 0.60 can be used as the fibrous carbon nanostructures. By using fibrous carbon nanostructures for which $3\sigma/Av$ is more than 0.20 and less than 0.80, performance of the composite material can be further improved.

The average diameter (Av) and the standard deviation (σ) of the fibrous carbon nanostructures may be adjusted by changing the production method and the production conditions of the fibrous carbon nanostructures, or may be adjusted by combining a plurality of types of fibrous carbon nanostructures obtained by different production methods.

The fibrous carbon nanostructures that are typically used take a normal distribution when a plot is made of diameter measured as described above on a horizontal axis and probability density on a vertical axis, and a Gaussian approximation is made.

The average length of the fibrous carbon nanostructures is preferably 10 µm or more, more preferably 50 µm or more, and even more preferably 80 or more, and is preferably 600 µm or less, more preferably 550 µm or less, and even more preferably 500 µm or less. When the average length of the fibrous carbon nanostructures is within any of the ranges set forth above, characteristics (for example, electrical conductivity, thermal conductivity, and strength) of the composite material can be sufficiently improved.

Note that the average length of the "fibrous carbon nanostructures" referred to in the present disclosure can be determined by measuring the lengths of 20 fibrous carbon nanostructures, for example, in a scanning electron microscope (SEM) image, and then calculating a number-average value of the measured lengths.

The fibrous carbon nanostructures normally have an aspect ratio of more than 10. Note that the aspect ratio of the fibrous carbon nanostructures can be determined by measuring the diameters and lengths of 20 randomly selected fibrous carbon nanostructures using a scanning electron microscope or a transmission electron microscope and then calculating an average value of the ratio of diameter and length (length/diameter).

The BET specific surface area of the fibrous carbon nanostructures is preferably 600 $m^2/g$ or more, and more preferably 800 $m^2/g$ or more, and is preferably 2,000 $m^2/g$ or less, more preferably 1,800 $m^2/g$ or less, and even more preferably 1,600 $m^2/g$ or less. When the BET specific surface area of the fibrous carbon nanostructures is 600 $m^2/g$ or more, characteristics (for example, electrical conductivity, thermal conductivity, and strength) of the composite material can be sufficiently increased using a small amount of the fibrous carbon nanostructures. Moreover, when the BET specific surface area of the fibrous carbon nanostructures is 2,000 $m^2/g$ or less, the fibrous carbon nanostructures can be dispersed well.

A t-plot for the fibrous carbon nanostructures obtained from an adsorption isotherm preferably exhibits a convex upward shape, and the fibrous carbon nanostructures are more preferably fibrous carbon nanostructures that have not undergone opening formation treatment. Note that a "t-plot" can be obtained by, in an adsorption isotherm of the fibrous carbon nanostructures measured by the nitrogen gas adsorption method, converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0, and the above-described conversion is made to obtain a t-plot for the fibrous carbon nanostructures (t-plot method of de Boer et al.).

In a substance having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that many openings are present in carbon nanostructures constituting the fibrous carbon nanostructures.

A bending point of the t-plot for the fibrous carbon nanostructures is preferably within a range of $0.2 \leq t$ (nm) $\leq 1.5$, more preferably within a range of $0.45 \leq t$ (nm)$\leq 1.5$, and even more preferably within a range of $0.55 \leq t$ (nm)$\leq 1.0$. When the bending point of the t-plot for the fibrous carbon nanostructures is within any of these ranges, characteristics (for example, electrical conductivity, thermal conductivity, and strength) of the composite material can be increased using a small amount of the fibrous carbon nanostructures.

The "position of the bending point" is defined as an intersection point of a linear approximation A for the above-described process (1) and a linear approximation B for the above-described process (3).

A ratio (S2/S1) of internal specific surface area S2 of the fibrous carbon nanostructures relative to total specific surface area S1 of the fibrous carbon nanostructures determined from the t-plot is preferably not less than 0.05 and not more than 0.30. When the value of S2/S1 for the fibrous carbon nanostructures is within this range, characteristics (for example, electrical conductivity, thermal conductivity, and strength) of the composite material can be increased using a small amount of the fibrous carbon nanostructures.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of the total specific surface area S1 and the internal specific surface area S2 based on t-plot analysis can be performed using a BELSORP®-mini (BELSORP is a registered trademark in Japan, other countries, or both), for example, which is a commercially available measurement apparatus produced by Bel Japan Inc.

The fibrous carbon nanostructures including CNTs that are suitable as the fibrous carbon nanostructures preferably have a radial breathing mode (RBM) peak when evaluated by Raman spectroscopy. Note that an RBM is not present in the Raman spectrum of fibrous carbon nanostructures composed of only multi-walled carbon nanotubes having three or more walls.

A ratio (G/D ratio) of G-band peak intensity relative to D-band peak intensity in a Raman spectrum of the fibrous carbon nanostructures including CNTs is preferably not less than 1 and not more than 4. When the G/D ratio is not less than 1 and not more than 4, performance of the composite material can be further improved.

The fibrous carbon nanostructures including CNTs can be produced by a known CNT synthesis method such as arc discharge, laser ablation, or chemical vapor deposition (CVD) without any specific limitations. More specifically, the fibrous carbon nanostructures including CNTs can be efficiently produced, for example, in accordance with a method in which, during synthesis of CNTs by chemical vapor deposition (CVD) by supplying a feedstock compound and a carrier gas onto a substrate having a catalyst layer for carbon nanotube production at the surface thereof, a trace amount of an oxidant (catalyst activating material) is provided in the system in order to dramatically improve the catalytic activity of the catalyst layer (super growth method; refer to WO2006/011655A1). The fibrous carbon nanostructures that are produced on the substrate can be peeled from the substrate and then used in that form (as-grown). Hereinafter, carbon nanotubes that are obtained by the super growth method are also referred to as "SGCNTs".

Fibrous carbon nanostructures produced by the super growth method may consist solely of SGCNTs or may include other carbon nanostructures such as non-circular tube-shaped carbon nanostructures, for example, in addition to SGCNTs.

Although no specific limitations are placed on the amount of the fibrous carbon nanostructures contained in the composite material, the amount of the fibrous carbon nanostructures per 100 parts by mass of the polymer, for example, is preferably 0.01 parts by mass or more, and more preferably 0.5 parts by mass or more, and is preferably 10 parts by mass or less, and more preferably 5 parts by mass or less. When the amount of the fibrous carbon nanostructures is not less than any of the lower limits set forth above, characteristics (for example, electrical conductivity, thermal conductivity, and strength) of the composite material can be sufficiently improved. Moreover, when the amount of the fibrous carbon nanostructures is not more than any of the upper limits set forth above, the fibrous carbon nanostructures can be dispersed well.

Additives

Examples of additives that can be used include, but are not specifically limited to, dispersants, antioxidants, heat stabilizers, light stabilizers, ultraviolet absorbers, cross-linkers, pigments, colorants, foaming agents, antistatic agents, flame retardants, lubricants, softening agents, tackifiers, plasticizers, mold release agents, deodorants, and perfumes.

Step (A)

In the step (A), the composite material is heated in an inert gas atmosphere to remove a polymer component from the composite material and obtain a polymer-removed product. By heating the composite material in an inert gas atmosphere in this manner, a polymer component can be decomposed and removed while maintaining the disentanglement state of the fibrous carbon nanostructures.

Inert Gas

The inert gas is not specifically limited and may be nitrogen gas, argon gas, neon gas, helium gas, carbon dioxide gas, or the like, for example. Of these examples, nitrogen gas is preferably used as the inert gas.

Heating

The heating of the composite material in the inert gas atmosphere can be performed using any device without any specific limitations but is preferably performed using a thermogravimetric analyzer. The use of a thermogravimetric analyzer makes it possible to implement the step (B) continuously after the step (A) inside a single thermogravimetric analyzer and makes it possible to determine the state of removal of the polymer component from weight change data.

The temperature and duration of heating of the composite material may be any temperature and duration depending on the type of polymer without any specific limitations so long as a temperature at which the polymer component can decompose in the inert gas atmosphere and at which the fibrous carbon nanostructures do not denature or decompose in the inert gas atmosphere is adopted.

More specifically, the temperature to which the composite material is heated is, for example, preferably 500° C. or higher, and more preferably 600° C. or higher, and is preferably 700° C. or lower.

Polymer-Removed Product

The polymer-removed product obtained in the step (A) normally contains the fibrous carbon nanostructures in substantially the same state as in the composite material. Note that the polymer-removed product may contain polymer that has been carbonized by heating and additives that can optionally be contained in the composite material.

Step (B)

In the step (B), thermogravimetric analysis of the polymer-removed product is performed in an oxygen-containing atmosphere such as an air atmosphere to measure change over time of mass of the polymer-removed product.

More specifically, thermogravimetric analysis of the polymer-removed product is performed in an oxygen-containing atmosphere of constant temperature in the step (B) to measure change over time of mass of the polymer-removed product.

The step (B) is preferably performed by, after performing the step (A) using the thermogravimetric analyzer, converting the inert gas atmosphere used in the step (A) to an oxygen-containing atmosphere.

The temperature at which thermogravimetric analysis of the polymer-removed product is performed is not specifically limited so long as it is a temperature at which the fibrous carbon nanostructures can combust in the oxygen-containing atmosphere, but is preferably 500° C. or higher, and more preferably 600° C. or higher, and is preferably 700° C. or lower. Measurement becomes time consuming when a temperature of lower than 500° C. is adopted. On the other hand, the combustion rate increases and the accuracy of evaluation of the disentanglement state of the fibrous carbon nanostructures may decrease when a temperature of higher than 700° C. is adopted.

Step (C)

In the step (C), the disentanglement state of the fibrous carbon nanostructures in the composite material is evaluated from a relationship between mass change of the polymer-removed product and elapsed time obtained in the step (B). Note that in the step (C), a thermogravimetric curve may be prepared from values for the mass of the polymer-removed product and elapsed time obtained through thermogravimetric analysis in the step (B) and then the disentanglement state of the fibrous carbon nanostructures may be evaluated using the thermogravimetric curve, or, alternatively, the disentanglement state of the fibrous carbon nanostructures may be evaluated from values for the mass of the polymer-removed product and elapsed time without preparing a thermogravimetric curve.

More specifically, the disentanglement state of the fibrous carbon nanostructures is evaluated from the amount by which the mass of the polymer-removed product decreases and the time taken for the mass to decrease in the step (C) by exploiting the fact that further progression of disentanglement of the fibrous carbon nanostructures results in the fibrous carbon nanostructures having a larger surface area and combusting more easily (i.e., a higher rate of mass loss during combustion). In more detail, disentanglement of the fibrous carbon nanostructures can be evaluated as having progressed less when the time taken for the mass to decrease is longer, whereas disentanglement of the fibrous carbon nanostructures can be evaluated as having progressed more when the time taken for the mass to decrease is shorter.

The polymer-removed product can contain components other than the fibrous carbon nanostructures such as polymer that has been carbonized in the step (A) and additives. In a case in which the polymer-removed product contains components other than the fibrous carbon nanostructures, the change over time of mass of the polymer-removed product when thermogravimetric analysis of the polymer-removed product is performed in the step (B) is also inclusive of the change of mass of the components other than the fibrous carbon nanostructures. For this reason, the step (C) preferably includes the following steps (c1) to (c3) from a viewpoint of evaluating the disentanglement state of the fibrous carbon nanostructures with higher accuracy in the step (C).

Specifically, it is preferable that the step (C) includes: a step (c1) of obtaining a derivative thermogravimetric curve from mass change of the polymer-removed product and elapsed time obtained in the step (B); a step (c2) of determining an elapsed time $T_1$ at which the derivative thermogravimetric curve takes a local minimum value directly before a peak on the derivative thermogravimetric curve corresponding to combustion of the fibrous carbon nanostructures; and a step (c3) of determining time taken for the mass $M_1$ of the polymer-removed product at the elapsed time Tito decrease to a specific proportion, and that the disentanglement state of the fibrous carbon nanostructures in the composite material is evaluated from the time taken.

Mass change of the polymer-removed product occurring after the elapsed time $T_1$ on the derivative thermogravimetric curve corresponds to mass change of only the fibrous carbon nanostructures. Accordingly, by determining the time taken for the mass $M_1$ of the polymer-removed product at the elapsed time $T_1$ to decrease to a specific proportion and then evaluating the disentanglement state of the fibrous carbon nanostructures in the composite material from the time taken, it is possible to reduce the influence of components other than the fibrous carbon nanostructures that are contained in the polymer-removed product and to evaluate the disentanglement state of the fibrous carbon nanostructures with higher accuracy.

Note that, in general, a final peak on the derivative thermogravimetric curve is a peak that corresponds to combustion of the fibrous carbon nanostructures.

The derivative thermogravimetric curve is obtained by, for example, calculating a time derivative of a thermogravimetric loss curve for the polymer-removed product obtained through fitting of mass change of the polymer-removed product and elapsed time obtained in the step (B). More specifically, the derivative thermogravimetric curve can be obtained by, for example, using a double Boltzmann function shown below to perform fitting of mass change of the polymer-removed product and elapsed time obtained in the step (B), and then calculating a time derivative of a thermogravimetric loss curve for the polymer-removed product that is obtained thereby, but is not specifically limited to being obtained in this manner.

$$y = y_0 + A\left[\frac{p}{1+e^{\frac{x-x_{01}}{k_1}}} + \frac{1-p}{1+e^{\frac{x-x_{02}}{k_2}}}\right]$$

The specific proportion can be set as $M_1 \times 0.10$ or $M_1 \times 0.50$, for example, without any specific limitations. In other words, the time taken for the mass $M_1$ of the polymer-removed product at the elapsed time Tito decrease to a specific proportion can, for example, be set as the time until the mass $M_1$ of the polymer-removed product decreases by 90% or the time until the mass $M_1$ of the polymer-removed product decreases by 50%.

In particular, the specific proportion is preferably set as $M_1 \times 0.10$. By using the time taken for the mass $M_1$ of the polymer-removed product to decrease to $M_1 \times 0.10$, it is possible to more accurately evaluate the disentanglement state of the fibrous carbon nanostructures.

In the presently disclosed method of evaluating a composite material, thermogravimetric analysis may be performed under the same conditions as in the step (B) with respect to a reference sample obtained by removing the fibrous carbon nanostructures from the composite material (i.e., a sample containing only components other than the fibrous carbon nanostructures), and the disentanglement state of the fibrous carbon nanostructures may be evaluated using a value obtained by subtracting the mass of the reference sample from the mass of the polymer-removed product in the step (C). This is performed from a viewpoint of reducing the influence of components other than the fibrous carbon nanostructures that are contained in the polymer-removed product and evaluating the disentanglement state of the fibrous carbon nanostructure with higher accuracy.

(Method of Producing Composite Material)

The presently disclosed method of producing a composite material is a method for efficiently producing a composite material in which fibrous carbon nanostructures are dispersed well by evaluating the disentanglement state of fibrous carbon nanostructures in a produced composite material using the presently disclosed method of evaluating a composite material, and then, based on the evaluation result thereof, optimizing disentanglement treatment conditions of fibrous carbon nanostructures in composite material production. Moreover, the presently disclosed method of producing a composite material is a method of producing a composite material containing a polymer and fibrous carbon nanostructures through a step of performing disentanglement treatment of the fibrous carbon nanostructures and a feature thereof is that the method includes: a step (α) of evaluating a disentanglement state of fibrous carbon nanostructures in a produced composite material using the presently disclosed method of evaluating a composite material set forth above; and a step (β) of, based on an evaluation result obtained in the step (α), altering a condition of the disentanglement treatment to obtain a fibrous carbon nanostructure disentanglement state that is within a desired range in a situation in which the disentanglement state of the fibrous carbon nanostructures is outside of the desired range.

Production of Composite Material

The composite material can be produced by any method without any specific limitations so long as it is produced through a step of performing disentanglement treatment of fibrous carbon nanostructures. More specifically, the composite material can be produced by, for example, (1) a method in which a polymer, fibrous carbon nanostructures, and additives that are optional components are kneaded in the presence or absence of an organic solvent so as to produce a composite material while also disentangling the fibrous carbon nanostructures; (2) a method in which fibrous carbon nanostructures are disentangled in a liquid that may contain a polymer and/or additives, a polymer is subsequently added in a case in which the resultant dispersion liquid does not contain a polymer, and then liquid (dispersion medium) is removed from the dispersion liquid to produce a composite material; or the like.

Note that the polymer, fibrous carbon nanostructures, and additives can be the same as those described in the "Method of evaluating composite material" section, and thus description thereof is omitted below. The organic solvent is not specifically limited and may, for example, be a polar organic solvent such as isopropyl alcohol, tetrahydrofuran, or methyl ethyl ketone or a non-polar organic solvent such as cyclohexane or toluene. Moreover, the dispersion medium may be water, any of the aforementioned organic solvents, or a mixture thereof.

The kneading can be performed without any specific limitations using a twin screw kneader, an open roll mill, a Banbury mixer, a pressurizing kneader, or the like, for example.

Moreover, the disentanglement of the fibrous carbon nanostructures in a liquid can be performed without any specific limitations using an ultrasonic disperser, a homogenizer, a thin-film spin system high-speed mixer, a bead mill, a wet jet mill, or the like, for example.

Step (α)

In the step (α), the disentanglement state of fibrous carbon nanostructures in a produced composite material is evaluated using the presently disclosed method of evaluating a composite material set forth above. By using the presently disclosed method of evaluating a composite material to perform sampling evaluation of a produced composite material in this manner, conditions of disentanglement treatment can then be optimized in the step (β).

Step (β)

In the step (β), based on an evaluation result obtained in the step (α), a condition of the disentanglement treatment is altered to obtain a fibrous carbon nanostructure disentanglement state that is within a desired range in a situation in which the disentanglement state of the fibrous carbon nanostructures is outside of the desired range.

More specifically, in a case in which, during evaluation of a composite material in the step (α), the time taken for mass loss of a polymer-removed product is long compared to when a composite material having a disentanglement state within a desired range is evaluated by the presently disclosed method of evaluating a composite material, for example, disentanglement is judged to be insufficient, and a condition of the disentanglement treatment is altered to obtain a fibrous carbon nanostructure disentanglement state that is within the desired range. Specifically, the duration of the disentanglement treatment may be lengthened or the intensity of the disentanglement treatment may be increased.

Moreover, in a case in which, during evaluation of a composite material in the step (α), the time taken for mass loss of a polymer-removed product is short compared to when a composite material having a disentanglement state within a desired range is evaluated by the presently disclosed method of evaluating a composite material, for example, disentanglement is judged to be excessive, and a condition of the disentanglement treatment is altered to obtain a fibrous carbon nanostructure disentanglement state that is within the desired range. Specifically, the duration of the disentanglement treatment may be shortened or the intensity of the disentanglement treatment may be reduced.

The desired range for the disentanglement state is not specifically limited and can be a range in which the composite material can display expected physical properties.

Note that in a case in which the result of evaluation of a composite material in the step (α) is that the disentanglement state of fibrous carbon nanostructures is within the desired range, composite material production may be continued without altering a condition of the disentanglement treatment, or a condition of the disentanglement treatment may be altered to the extent that a fibrous carbon nanostructure disentanglement state that is within the desired range is obtained.

Composite Material

The presently disclosed composite material contains a polymer and fibrous carbon nanostructures and may optionally further contain various additives depending on the use of the composite material. Note that the polymer, fibrous carbon nanostructures, and additives can be the same as any of those described in the "Method of evaluating composite material" section, and thus description thereof is omitted below.

A feature of the presently disclosed composite material is that it gives a specific evaluation result when evaluated as a sheet of 150 μm in thickness under specific conditions using the presently disclosed method of evaluating a composite material. More specifically, when the presently disclosed composite material, as a sheet of 150 μm in thickness, is subjected to removal of a polymer component in the sheet in an inert gas atmosphere at 600° C. to obtain a polymer-removed product, and then the atmosphere is switched from an inert gas to air and change over time of mass of the polymer-removed product is measured, the presently disclosed composite material gives the following evaluation result:

time taken for mass $M_1$ of the polymer-removed product to decrease to $M_1 \times 0.10$ is 250 seconds or less, where the mass $M_1$ is the mass of the polymer-removed product at an elapsed time $T_1$ at which a derivative thermogravimetric curve obtained from mass change of the polymer-removed product and elapsed time takes a local minimum value directly before a final peak. Moreover, the time taken can be 60 seconds or more.

Note that the inert gas can be the same as any of those described in the "Method of evaluating composite material" section, and thus description of the inert gas is omitted below.

A composite material for which, in evaluation by a specific method and conditions, the time taken for the mass of a polymer-removed product thereof to decrease from $M_1$ to $M_1 \times 0.10$ is 250 seconds or less in this manner has good dispersion of fibrous carbon nanostructures and can display excellent physical properties. Moreover, a composite material for which the time taken for the mass of a polymer-removed product thereof to decrease from $M_1$ to $M_1 \times 0.10$ is not less than the lower limit set forth above has a suitable degree of disentanglement of fibrous carbon nanostructures and can display excellent physical properties.

The composite material set forth above can be produced by, for example, removing a dispersion medium from a dispersion liquid that contains a dispersion medium, a polymer dissolved in the dispersion medium, and bundles of fibrous carbon nanostructures, and in which the average diameter (DB) of the bundles is not less than 20 nm and not more than 600 nm, but is not specifically limited to being produced in this manner.

Note that the dispersion medium can be the same as any of those described in the "Method of producing composite material" section. Removal of the dispersion medium can be performed using a known drying method such as drying, vacuum drying, drying under reduced pressure, or drying under inert gas flow.

The dispersion liquid can be produced by using dispersing media to perform dispersing treatment of the polymer, the dispersion medium, and the fibrous carbon nanostructures. In particular, it is preferable that the dispersion liquid is produced by dissolving the polymer in the dispersion medium to obtain a dissolved polymer solution, and subsequently using dispersing media to perform dispersing treatment of the dissolved polymer solution and the fibrous carbon nanostructures.

The dispersing treatment using dispersing media can suitably be performed using a known wet media dispersing device such as a bead mill, for example. The material forming the dispersing media is not specifically limited and may be glass, alumina, zircon (zirconia-silica ceramic), zirconia, steel, or the like, for example.

The Vickers hardness of the dispersing media is preferably 600 kgf/mm$^2$ or more, more preferably 800 kgf/mm$^2$ or more, and even more preferably 1,000 kgf/mm$^2$ or more, and is preferably 1,500 kgf/mm$^2$ or less, and more preferably 1,300 kgf/mm$^2$ or less.

The loading rate of the dispersing media is preferably 40 volume % or more, and more preferably 50 volume % or more, and is preferably 80 volume % or less, more preferably 70 volume % or less, and even more preferably 60 volume % or less.

The average diameter of the dispersing media is preferably 0.1 mm or more, and more preferably 0.3 mm or more, and is preferably 1.5 mm or less, more preferably 1 mm or less, and even more preferably 0.8 mm or less.

Examples

The following describes the present disclosure through specific examples. However, the present disclosure is not limited to these examples. In the following description, "%" and "parts" used in expressing quantities are by mass, unless otherwise specified.

Production and Evaluation of Composite Material 1

A dissolved polymer solution was obtained by adding 100 g of FKM (vinylidene fluoride rubber; produced by The Chemours Company; product name: Viton GBL-6005) as a polymer to 900 g of methyl ethyl ketone as a dispersion medium and performing stirring thereof for 12 hours at a temperature of 20° C. to dissolve the polymer.

Next, 4 g of SGCNTs (produced by Zeon Nanotechnology Co., Ltd.; product name: ZEONANO SG101; average diameter (DS): 4 nm; BET specific surface area: 1,391 m$^2$/g; G/D ratio: 3.2; not subjected to opening formation treatment and having a convex upward t-plot) as fibrous carbon nanostructures including single-walled CNTs were added to the dissolved polymer solution and were stirred therewith for 30 minutes at a temperature of 20° C. using a stirrer (LABO-LUTION® (LABOLUTION is a registered trademark in Japan, other countries, or both) produced by PRIMIX Corporation; mixing head: Homo Disper). The dissolved polymer solution to which the SGCNTs had been added was then further subjected to 2 passes of dispersing treatment (dispersing treatment conditions: circumferential speed 8 m/s, discharge rate 180 g/min) at a temperature of 44° C. using a bead mill (produced by Asada Iron Works Co., Ltd.; product name: Nanomill NM-G1.4L; dispersing media: glass beads (dispersing media Vickers hardness: 550 kgf/mm$^2$; dispersing media loading rate: 80%; dispersing media average diameter: 2 mm)).

The resultant dispersion liquid was subsequently dripped into 4,000 g of methanol to cause coagulation and yield a black solid. The obtained black solid was vacuum dried at 60° C. for 12 hours to obtain a composite material 1.

The obtained composite material 1 was used to evaluate elongation at break as described further below.

Next, four lumps of 300 mg were weighed out from the obtained composite material 1, were sandwiched between polyimide films, and were placed on a pressing plate of a heat-press machine. Heat pressing was performed under conditions of a pressing pressure of 4 MPa, a pressing time of 20 minutes, and a pressing temperature of 200° C. to obtain a sheet (shaped product) of 0.15 mm (150 µm) in thickness.

The obtained sheet was used to evaluate the disentanglement state of the SGCNTs as described below.

Disentanglement State of SGCNTs

A thermogravimetric analyzer (produced by TA Instruments Japan; product name: Discovery TGA5500) was used to perform thermogravimetric analysis of the sheet.

More specifically, the sheet serving as a measurement sample was installed and was then heated to 600° C. at a heating rate of 20° C./min and held at 600° C. for 10 minutes in a nitrogen gas atmosphere. Next, the atmosphere was switched from a nitrogen gas atmosphere to an air atmosphere while maintaining the temperature at 600° C., and then the temperature was held at 600° C. for 20 minutes. After switching to the air atmosphere, a thermogravimetric curve (thermogravimetric loss curve) and a derivative thermogravimetric curve were prepared from the mass change and elapsed time. The prepared curves are illustrated in FIG. 1A. Note that the thermogravimetric loss curve was prepared through fitting of the mass change and elapsed time using a double Boltzmann function, and the derivative thermogravimetric curve was prepared by calculating a time derivative of the thermogravimetric loss curve.

Moreover, the elapsed time $T_1$ at which the derivative thermogravimetric curve took a local minimum value directly before a last peak on the derivative thermogravimetric curve was determined from the derivative thermogravimetric curve, and the mass $M_1$ of the measurement sample at the elapsed time $T_1$ was determined from the thermogravimetric curve. In addition, the time taken for $M_1$ to decrease to $M_1 \times 0.10$ (i.e., the 90% loss time) and the time taken for $M_1$ to decrease to $M_1 \times 0.50$ (i.e., the 50% loss time) were determined. The results are shown in Table 1.

Elongation at Break

After weighing out 208 g of the obtained composite material 1, 6 g of JIS Grade 2 zinc white, 9.84 g of TAIC M-60 (produced by Mitsubishi Chemical Corporation), and 4 g of PERHEXA 25B40 (produced by NOF Corporation), these materials were uniformly kneaded using a 6 inch roll mill to produce a non-crosslinked compound. The non-crosslinked compound was loaded into a sheet molding mold of 150 mm×150 mm×2 mm that had been preheated, bumping was subsequently performed twice at 3 MPa and once at 10 MPa, and then compression crosslinking molding was performed under 10 MPa pressurization to produce a primary crosslinked sheet. Next, this primary crosslinked sheet was removed from the mold, was loaded into a Geer oven that had been preheated to 232° C., and was heat treated for 2 hours to produce a secondary crosslinked sheet.

This secondary crosslinked sheet was punched out in a No. 3 dumbbell shape to obtain a test specimen. The elongation at break at 23° C. of the obtained test specimen was measured in accordance with JIS K6251. Note that the elongation at break is a value determined by taking the initial value (i.e., before sheet tensing) to be 100%.

In addition, the elongation at break at 23° C. after a sheet had been held at 230° C. for 70 hours in an air atmosphere (i.e., after a heat aging test) was measured in the same way as described above.

Figure 2A:
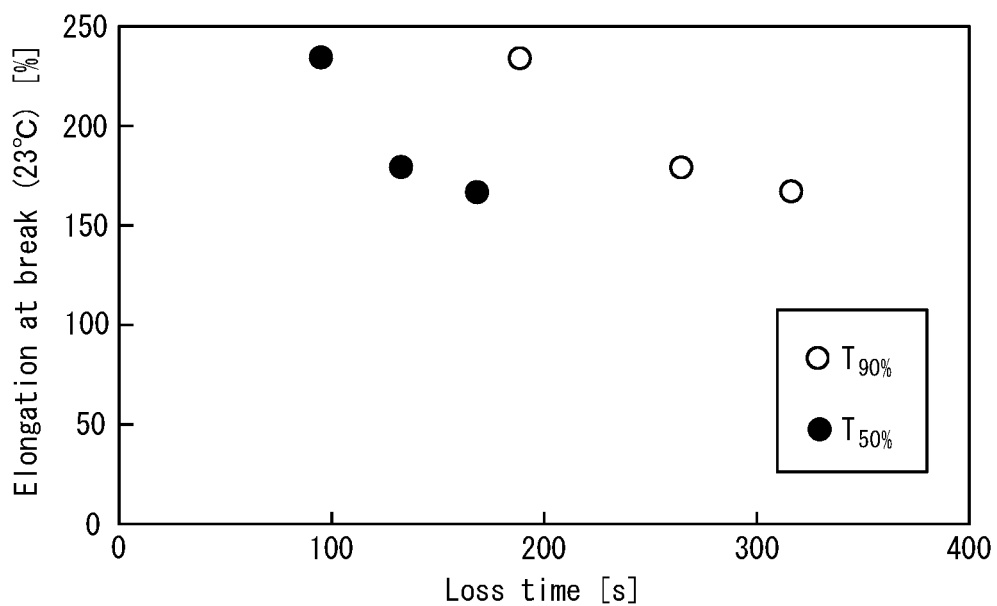
FIGS. 2A and 2B are graphs illustrating relationships between physical properties of composite materials 1 to 3 and times taken for the mass of a polymer-removed product of each of these composite materials to decrease to $M_1 \times 0.10$ and to $M_1 \times 0.50$.
Figure 2B:
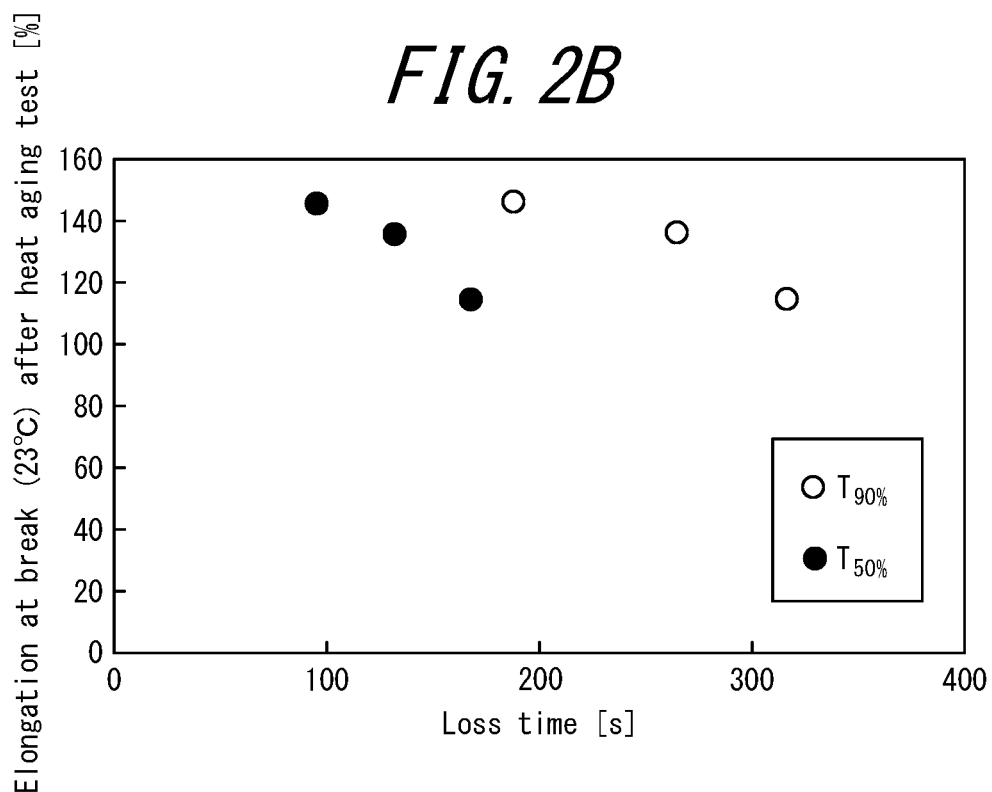

The results are shown in Table 1 and are illustrated in FIGS. 2A and 2B.

Production and Evaluation of Composite Material 2

Figure 1B:
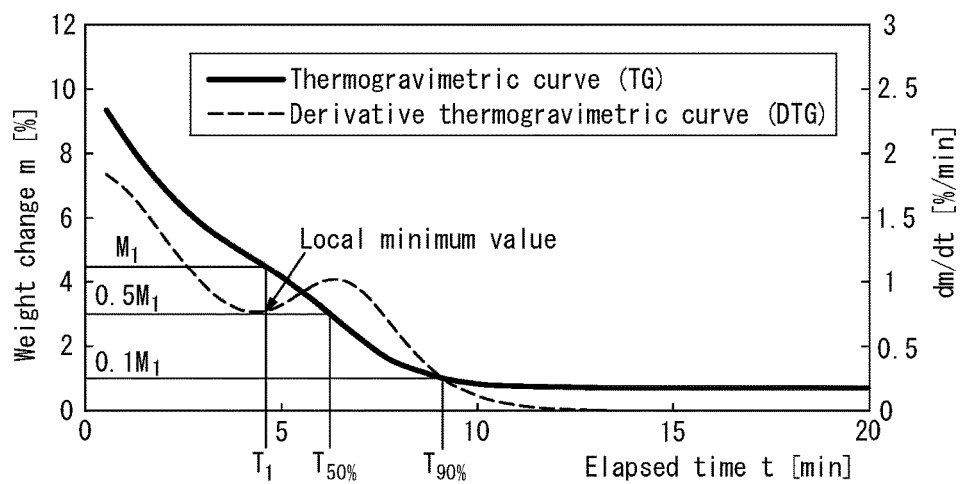

A composite material 2 was produced and evaluated in the same way as the composite material 1 with the exception that in dispersing treatment of the dissolved polymer solution to which SGCNTs had been added, the dispersing media were changed to zirconia beads (dispersing media Vickers hardness: 1,250 kgf/mm²; dispersing media loading rate: 80%; dispersing media average diameter: 1.5 mm), and 3 passes of dispersing treatment were performed at a circumferential speed of 12.5 m/s. The results are shown in Table 1 and are illustrated in FIGS. 1B, 2A, and 2B.

Production and Evaluation of Composite Material 3

Figure 1C:
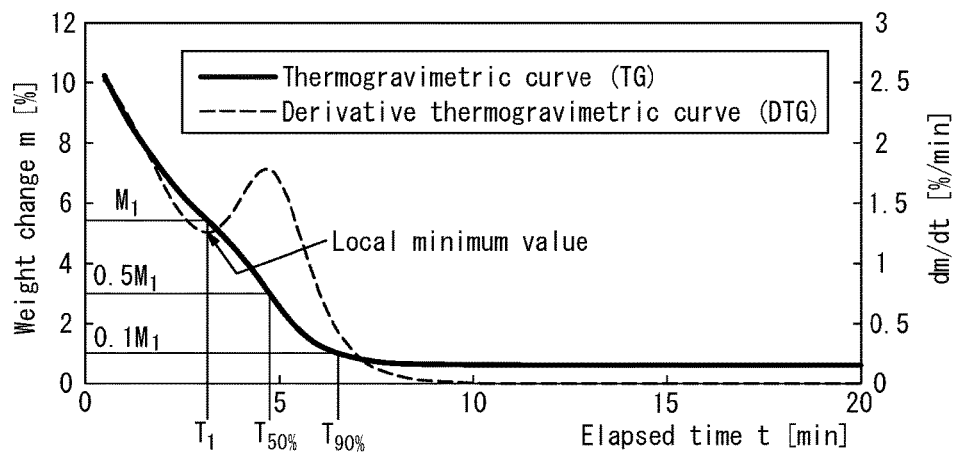

A composite material 3 was produced and evaluated in the same way as the composite material 1 with the exception that in dispersing treatment of the dissolved polymer solution to which SGCNTs had been added, the dispersing media were changed to zirconia beads (dispersing media Vickers hardness: 1,250 kgf/mm²; dispersing media loading rate: 80%; dispersing media average diameter: 0.3 mm), and 6 passes of dispersing treatment were performed at a circumferential speed of 12.5 m/s. The results are shown in Table 1 and are illustrated in FIGS. 1C, 2A, and 2B.

TABLE 1

| | | Composite material 1 | Composite material 2 | Composite material 3 |
|---|---|---|---|---|
| Composition | FKM [parts by mass] | 100 | 100 | 100 |
| | SGCNTs [parts by mass] | 4 | 4 | 4 |
| Production conditions | Bead type | Glass | Zirconia | Zirconia |
| | Bead diameter [mm] | 2 | 1.5 | 0.3 |
| | Circumferential speed [m/s] | 8 | 12.5 | 12.5 |
| | No. of treatments [passes] | 2 | 3 | 6 |
| Evaluation | 50% loss time [s] | 168 | 132 | 95 |
| | 90% loss time [s] | 316 | 265 | 188 |
| | Elongation at break (23° C.) [%] | 167 | 179 | 234 |
| | Elongation at break (23° C.) after heat aging test [%] | 115 | 136 | 146 |

It can be seen from Table 1 and FIGS. 2A and 2B that the composite materials 2 and 3 for which the intensity of dispersing treatment was increased and to which high shear force was imparted each have a shorter 90% loss time and 50% loss time than the composite material 1, and the disentanglement state of SGCNTs can be quantitatively evaluated by using the presently disclosed evaluation method.

It can also be seen that compared to the composite material 1, the composite materials 2 and 3 have excellent elongation both straight after sheet formation and also after heating, and have good dispersion of SGCNTs.

INDUSTRIAL APPLICABILITY

According to the presently disclosed method of evaluating a composite material, it is possible to quantitatively evaluate the disentanglement state of fibrous carbon nanostructures in a composite material by a simple method.

Moreover, according to the presently disclosed method of producing a composite material, it is possible to efficiently produce a composite material in which fibrous carbon nanostructures are dispersed well.

Furthermore, according to the present disclosure, it is possible to obtain a composite material in which fibrous carbon nanostructures are dispersed well.

The invention claimed is:
1. A method of evaluating a composite material containing a polymer and fibrous carbon nanostructures, comprising:
   a step (A) of heating the composite material in an inert gas atmosphere to remove a polymer component from the composite material and obtain a polymer-removed product;
   a step (B) of performing thermogravimetric analysis of the polymer-removed product in an oxygen-containing atmosphere to measure change over time of mass of the polymer-removed product; and
   a step (C) of evaluating a disentanglement state of the fibrous carbon nanostructures in the composite material from a relationship between mass change of the polymer-removed product and elapsed time obtained in the step (B).
2. The method of evaluating a composite material according to claim 1, wherein the step (C) includes:

a step (c1) of obtaining a derivative thermogravimetric curve from mass change of the polymer-removed product and elapsed time obtained in the step (B);

a step (c2) of determining an elapsed time $T_1$ at which the derivative thermogravimetric curve takes a local minimum value directly before a final peak on the derivative thermogravimetric curve; and a step (c3) of determining time taken for mass $M_1$ of the polymer-removed product at the elapsed time $T_1$ to decrease to a specific proportion, and the disentanglement state of the fibrous carbon nanostructures in the composite material is evaluated from the time taken.

3. The method of evaluating a composite material according to claim 2, wherein time taken for mass of the polymer-removed product to decrease to $M_1 \times 0.10$ is determined in the step (c3).

4. The method of evaluating a composite material according to claim 2, wherein time taken for mass of the polymer-removed product to decrease to $M_1 \times 0.50$ is determined in the step (c3).

5. A method of producing a composite material containing a polymer and fibrous carbon nanostructures through a step of performing disentanglement treatment of the fibrous carbon nanostructures, the method comprising:

a step ($\alpha$) of evaluating a disentanglement state of fibrous carbon nanostructures in a produced composite material using the method of evaluating a composite material according to claim 1; and a step ($\beta$) of, based on an evaluation result obtained in the step ($\alpha$), altering a condition of the disentanglement treatment so as to obtain a fibrous carbon nanostructure disentanglement state that is within a desired range in a situation in which the disentanglement state of the fibrous carbon nanostructures is outside of the desired range.

* * * * *